No. 873,575. PATENTED DEC. 10, 1907.
J. A. MEEKS & F. C. KAISER.
SELF FEEDING SAWING MACHINE.
APPLICATION FILED MAR. 20, 1907.
2 SHEETS—SHEET 1.
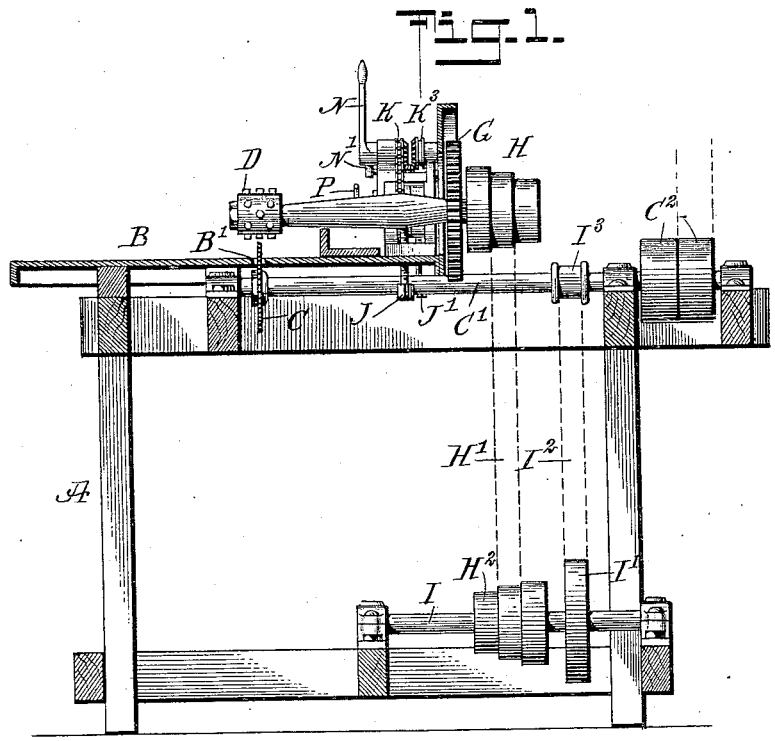
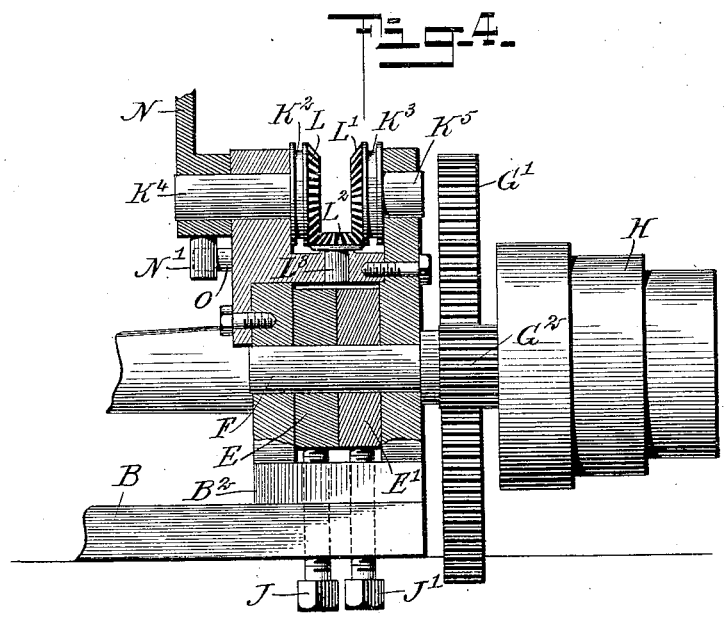
WITNESSES
INVENTORS
Jacob Arthur Meeks
Fredrick C. Kaiser
BY
ATTORNEYS.

No. 873,575. PATENTED DEC. 10, 1907.
J. A. MEEKS & F. C. KAISER.
SELF FEEDING SAWING MACHINE.
APPLICATION FILED MAR. 20, 1907.
2 SHEETS—SHEET 2.
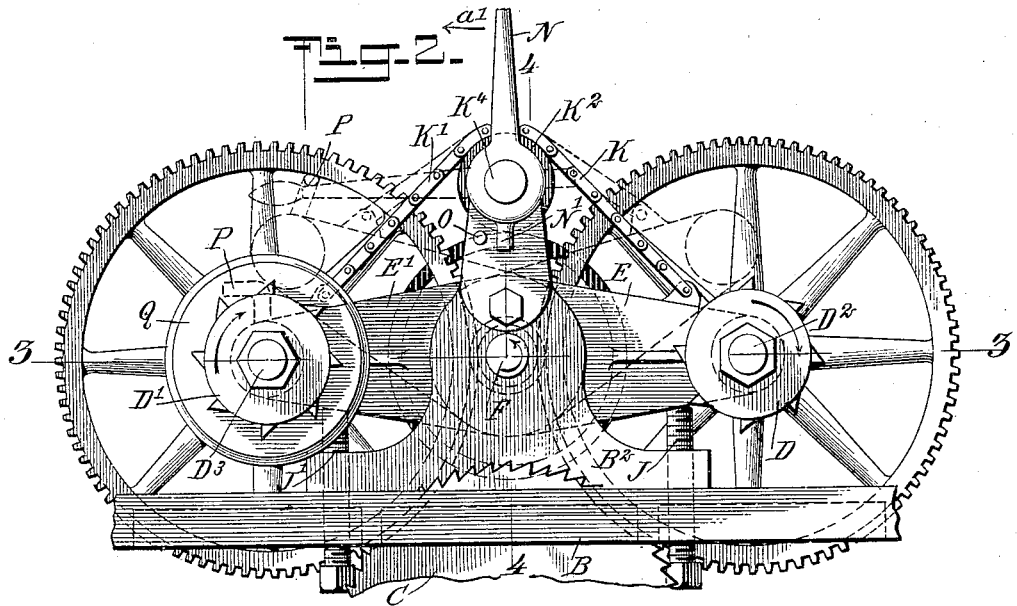
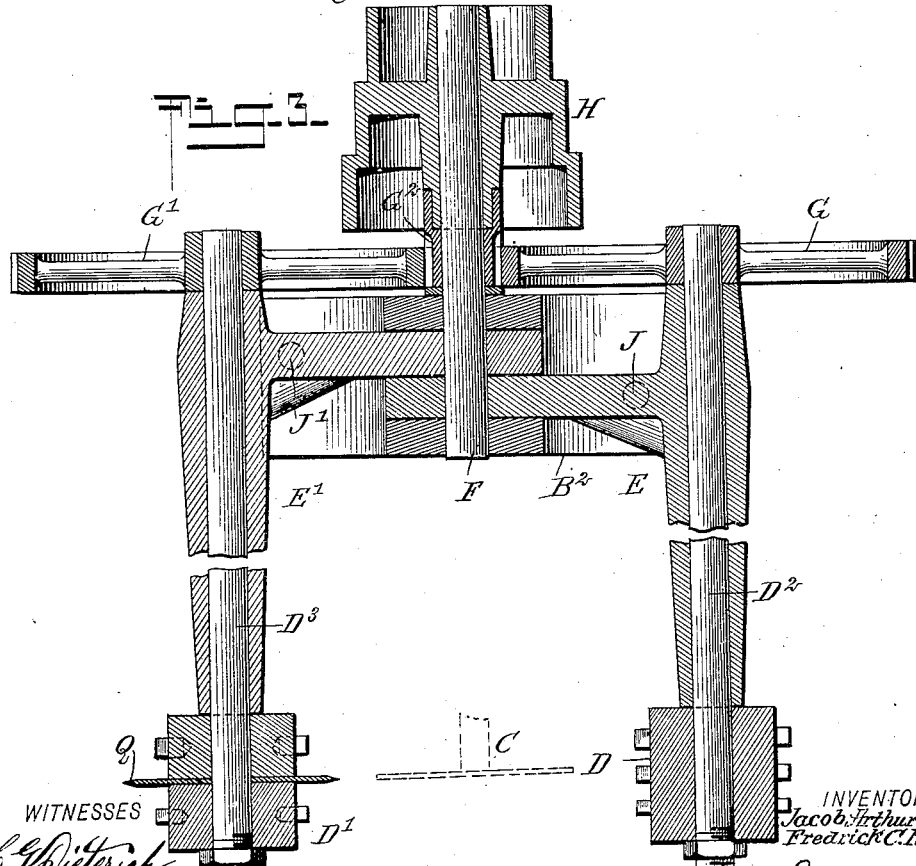
WITNESSES
INVENTORS
Jacob Arthur Meeks
Fredrick C. Kaiser
By ATTORNEYS

UNITED STATES PATENT OFFICE.

JACOB ARTHUR MEEKS AND FREDRICK CHRISTOPHER KAISER, OF MUNCIE, INDIANA.

SELF-FEEDING SAWING-MACHINE.

No. 873,575.  Specification of Letters Patent.  Patented Dec. 10, 1907.

Application filed March 20, 1907. Serial No. 363,413.

*To all whom it may concern:*

Be it known that we, JACOB ARTHUR MEEKS and FREDRICK CHRISTOPHER KAISER, both citizens of the United States, and residents of Muncie, in the county of Delaware and State of Indiana, have invented a new and Improved Self-Feeding Sawing-Machine, of which the following is a full, clear, and exact description.

The invention relates to circular saw machines, and its object is to provide a new and improved self-feeding sawing machine, arranged to automatically adjust the positive feed to varying thicknesses of the material to be sawed, to protect the circular saw and the operator, to allow of throwing the feed out of action or stopping the feed instantly, and to permit variation of the feed according to the nature of the wood to be sawed.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a cross section of the improvement; Fig. 2 is an enlarged side elevation of the feeding mechanism; Fig. 3 is a sectional plan view of the same on the line 3—3 of Fig. 2, and Fig. 4 is a transverse section of the same on the line 4—4 of Fig. 2.

On a suitably constructed frame A is mounted the usual feed table B over which the material is fed and sawed by the circular saw C extending through a slot B' in the feed table B. The circular saw C has its arbor C' journaled in suitable bearings arranged on the frame A, and on the said arbor are held the usual fast and loose pulleys $C^2$ connected by belt with other machinery, for imparting a rotary motion to the arbor C' and its circular saw C.

A distance above the feed table B and in the front and rear of the circular saw C are arranged positively driven feed rollers D and D' having their shafts $D^2$, $D^3$ journaled in suitable bearings arranged on the free ends of swing arms E, E', mounted to swing loosely on a stud F held on a bracket $B^2$ attached to the top of the feed table B. The rear ends of the feed roller shafts $D^2$ and $D^3$ are provided with spur gear wheels G, G' in mesh with a pinion $G^2$ secured to and rotating with a cone pulley H connected by a belt H' with a cone pulley $H^2$ secured on the counter shaft I journaled in suitable bearings on the main frame A, and provided with a pulley I' connected by a belt $I^2$ with a pulley $I^3$ secured on the arbor C', so that when the latter is rotated a rotary motion is given to the counter shaft I, which by the cone pulleys $H^2$, H and the belt H' rotates the pinion $G^2$, and as the latter is in mesh with both gear wheels G, G' it is evident that the feed rollers D, D' are positively driven and rotated in the same direction, so as to feed the material past the saw C for the latter to cut the material in the usual manner.

The swing arms E and E' normally rest on adjusting screws J and J' screwing in the bracket $B^2$ and allowing of adjusting the swing arms E and E' so as to raise or lower the feed rollers D and D' according to the thickness of the material to be sawed. By having the swing arms E and E' free to swing upward at any time, it is evident that they readily adjust themselves to varying thicknesses in the material to be fed forward by the feed rollers, and hence a proper feeding of the material takes place at all times.

In order to permit of raising the feed rollers D and D' simultaneously and quickly out of engagement with the material to be sawed, the following device is provided: The swing arms E and E' are connected with the lower ends of chains K and K', secured at their upper ends to drums $K^2$, $K^3$, having their shafts $K^4$, $K^5$ journaled in suitable bearings on the bracket $B^2$ (see Fig. 4). The drums $K^2$ and $K^3$ are provided on their opposite faces with beveled gear wheels L, L' in mesh with opposite sides of a bevel pinion $L^2$ mounted to rotate loosely on a stud $L^3$ held on the bracket $B^2$. The forward end of the shaft $K^4$ for the drum $K^2$ is provided with an upwardly extending handle N under the control of the operator, for turning the said shaft $K^4$, the drum $K^2$ and the beveled gear wheel L, so as to wind up the chain K and at the same time impart a rotary motion to the beveled gear wheel L' and the drum $K^3$ by the intermediate bevel pinion $L^2$, so that the other chain K' is also wound up, and consequently both the swing arms E and E' are caused to swing upward on swinging the handle N over in the direction of the arrow $a'$. When the handle N is swung back into a vertical position, then the chains K, K' unwind from their drums $K^2$, $K^3$, thus allowing the swing arms E and E' to swing back to their normal active position, that is, until the swing arms rest on the adjusting screws J and J'.

The lower end of the handle N is provided with an offset N' adapted to engage a stop pin O, to prevent swinging of the handle N into the wrong direction, it being understood that when the handle N is swung over to the left, as described, it can be locked in this position by hooks P mounted to turn on the swing arm E' (see Fig. 2). Thus by the arrangement described the feed rollers D and D' can be held locked in a raised position, so as to permit of using the saw C as a rip saw. It is understood that when the swing arms E and E' swing up or down, the gear wheels G, G' remain in mesh with the pinion $G^2$, as the said swing arms are both fulcrumed on the stud F, on which the cone pulley H and the pinion $G^2$ are mounted to rotate.

On the rear feed roller D' is secured a splitter disk Q adapted to pass into the cut made by the saw C into the material, so as to prevent the saw from getting stuck in sappy, knotty or like material, thus protecting both the saw and the operator having hold of the material. It is understood that the splitter disk Q is in alinement with the saw C, as indicated in Fig. 2.

From the foregoing it will be seen that the feed rollers D and D' automatically adjust themselves to different or varying thicknesses of material, and both feed rollers are positively driven, thus insuring a positive feed of the material past the saw C.

By the manually controlled device for swinging the arms E and E' upward, it is possible to instantly lift the feed rollers D and D' out of contact with the material to be sawed whenever it is desired to do so.

By the use of the cone pulleys H and $H^2$ and the belt H', the speed of the feed rollers D and D' can be varied according to the nature of the material under treatment.

Having thus described our invention, we claim as new and desire to secure by Letters Patent:

1. A self-feeding sawing machine comprising a circular saw, positively driven feed rollers located one in front of the saw and the other in the rear thereof for feeding the material past the saw, swing arms in which the feed rollers are journaled, flexible connections with the said swing arms, and a manually controlled mechanism connected with said flexible connections for simultaneously swinging the said arms in or out of active position.

2. A self-feeding sawing machine comprising a circular saw, positively driven feed rollers, located one in front of the saw and the other in the rear thereof, for feeding the material past the saw, swing arms in which the feed rollers are journaled, stop screws for the swing arms to rest on, flexible connections with said swing arms, and means for simultaneously moving said flexible connections to swing the said arms in or out of active position.

3. A self-feeding sawing machine comprising a circular saw, positively driven feed rollers located one in front of, the other in the rear of, the said circular saw, for feeding the material past the saw, swing arms in which the feed rollers are journaled, flexible connections with the said swing arms, drums engaged by the said flexible connections, and a manually controlled gearing for simultaneously rotating the said drums in opposite directions.

4. A self-feeding sawing machine comprising a circular saw, positively driven feed rollers located one in front of the other in the rear of, the said circular saw for feeding the material past the saw, swing arms in which the feed rollers are journaled, flexible connections with the said swing arms, drums engaged by the said flexible connections, beveled gear wheels on the said drums, an intermediate bevel pinion in mesh with both gear wheels, and a handle on one of the said drums for turning the same and rotating both drums simultaneously in opposite directions to swing the swing arms up or down.

5. A self-feeding sawing machine comprising a circular saw, positively driven feed rollers located one in front of, the other in the rear of, the said circular saw, for feeding the material past the saw, swing arms in which the feed rollers are journaled, flexible connections with the said swing arms, drums engaged by the said flexible connections, beveled gear wheels on the said drums, an intermediate bevel pinion in mesh with both gear wheels, a handle on one of the said drums for turning the same and rotating both drums simultaneously in opposite directions, to swing the swing arms up or down, and a locking device on one of the swing arms for locking the said handle in position when the feed rollers are in a raised inactive position.

6. A positive feeding mechanism for sawing machines comprising a pair of spaced feed rollers, swing arms in which the shafts of the said feed rollers are journaled, a stud on which the swing arms are fulcrumed, chains connected with the said swing arms, drums connected with the said chains, a manually controlled gearing for rotating the drums simultaneously in opposite directions, and a gearing for positively driving the said feed roller shafts.

7. A positive feeding mechanism for sawing machines comprising a pair of spaced feed rollers, swing arms in which the shafts of the said feed rollers are journaled, a stud on which the swing arms are fulcrumed, chains connected with the said swing arms, drums connected with the said chains, beveled gear wheels on the said drums, a bevel pinion in mesh with both beveled gear wheels, and manually controlled means for turning one of the said drums.

8. A positive feeding mechanism for sawing machines comprising a pair of spaced feed rollers, swing arms in which the shafts of the said feed rollers are journaled, a stud on which the swing arms are fulcrumed, chains connected with the said swing arms, drums connected with the said chains, beveled gear wheels on the said drums, a bevel pinion in mesh with both beveled gear wheels, manually controlled means for turning one of the said drums, a driven pulley loose on the said stud, a spur pinion rotating with the said pulley, and spur gear wheels on the feed roller shafts and in mesh with the said pinion.

9. A self-feeding sawing machine comprising a circular saw, positively driven feed rollers located one in front of the saw and the other in the rear thereof, for feeding the material past the saw, the rear feed roller being provided with a splitter disk, swing arms in which the feed rollers are journaled, flexible connections with the said swing arms, drums engaged by the said flexible connections and means for simultaneously rotating the drums in opposite directions.

10. A positive feeding mechanism for sawing machines comprising a pair of spaced feed rollers, swing arms in which the shafts of the said feed rollers are journaled, a stud on which the swing arms are fulcrumed, a driven pinion on the said stud, gear wheels secured on the feed roller shafts and in mesh with the said pinion, chains connected with the said swing arms, drums connected with the said chains, and manually controlled means for rotating the drums simultaneously in opposite directions.

In testimony whereof we have signed our names to this specification in the presence of two subscribing witnesses.

JACOB ARTHUR MEEKS.
FREDRICK CHRISTOPHER KAISER.

Witnesses:
L. D. VAN MATRE,
MYRON H. GRAY.